United States Patent [19]

Strachan

[11] 3,973,318

[45] Aug. 10, 1976

[54] METHOD OF MAKING A FUSE PULLER

[75] Inventor: Ronald A. Strachan, Malta, Ill.

[73] Assignee: Ideal Industries, Inc., Sycamore, Ill.

[22] Filed: July 28, 1975

[21] Appl. No.: 599,328

[52] U.S. Cl. .......... 29/437; 29/278; 81/3.8; 264/242

[51] Int. Cl.[2] .......... B32B 31/04; B25B 27/14

[58] Field of Search .......... 29/437, 434, 278, 280; 81/3.8; 264/242

[56] References Cited

UNITED STATES PATENTS

| | | | |
|---|---|---|---|
| 1,481,517 | 1/1924 | Kurz | 81/3.8 |
| 1,539,302 | 5/1925 | Curtis | 81/3.8 |
| 1,561,082 | 11/1925 | Jung | 81/3.8 |
| 1,753,181 | 4/1930 | Grinnell | 81/3.8 |
| 1,798,890 | 3/1931 | Mayo et al. | 29/437 |
| 2,236,941 | 4/1941 | Foley | 81/3.8 |
| 2,430,544 | 11/1947 | Walker | 81/3.8 |
| 3,161,085 | 12/1964 | Pratt | 81/3.8 |
| 3,215,006 | 11/1965 | Urani | 81/3.8 |
| 3,242,564 | 3/1966 | Longhini | 264/242 |

*Primary Examiner*—Lowell A. Larson
*Assistant Examiner*—Dan C. Crane
*Attorney, Agent, or Firm*—Kinzer, Plyer, Dorn & McEachran

[57] ABSTRACT

This is concerned with a method of making a fuse puller, preferably by molding plastic in which two arm members are formed with leaves or arms and spacers at each end thereof and at least one of the arm members has one end free or open so that it may be interleaved or inserted between the spaced arm members, generally in the middle thereof, of the other arm member.

11 Claims, 7 Drawing Figures

METHOD OF MAKING A FUSE PULLER

SUMMARY OF THE INVENTION

This invention is concerned with a method of making a fuse puller. Gripper-type fuse pullers are well known and use flat parts stamped from sheet stock and spacing washers, or the like, to separate these parts in a manner such that they are interleaved to form a laminated union. Each of the individual arms are mounted on a common hinge pin with adjacent arms being laid in the opposite hand to their neighbors. All arms laid to like hand are then riveted together with spacers being used as necessary, to make each side the half of a gripper-type tool, with the tool functioning in the manner of a pair of pliers. The material of the fuse puller should be nonconductive for obvious reasons. The material of the arms has usually been a hard impregnated fiber, but the cost of hard impregnated fiber material has risen so much recently that making a fuse puller out of plastic has become desirable. Additionally, plastic offers a much greater choice of design possibilities, particularly in simplicity of molding and manufacturing.

A primary object of the invention is a method of making a fuse puller out of plastic.

Another object is a method of making a fuse puller with two arm assemblies, one of which has its ends closed and the other of which may have one open end which may be interleaved through the middle of the first one.

Another object is a method of making a fuse puller of the above type which greatly reduces its expense.

Other objects will appear from time to time in the ensuing specification and drawings.

DESCRIPTION OF THE PREFERRED EMBODIMENT

Figure 1:
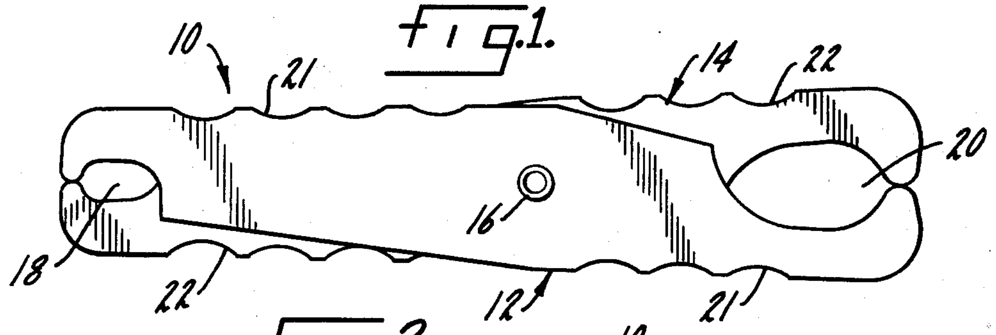
FIG. 1 is a side view of a fuse puller.
Figure 2:
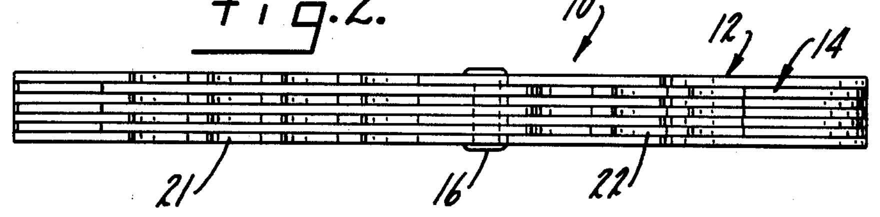
FIG. 2 is a top view of FIG. 1.

In FIGS. 1 and 2 a fuse puller has been indicated generally at 10 and includes two arm members 12 and 14 which are pivoted together at a center pivot 16, which may be a rivet or the like, with opposed jaw surfaces 18 and 20 on the inside thereof at each end for grasping and pulling a fuse in the well known manner. Finger-gripping portions 21 may be provided on the outside at each end of the outer arm member 12, and finger-gripping portions 22 may be provided on the outside at each end of the inner arm member 14.

Figure 3:
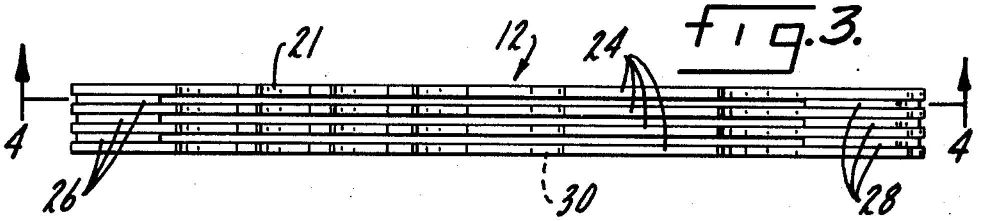
FIG. 3 is a top view of one of the arm members of the fuse puller in FIGS. 1 and 2.
Figure 4:
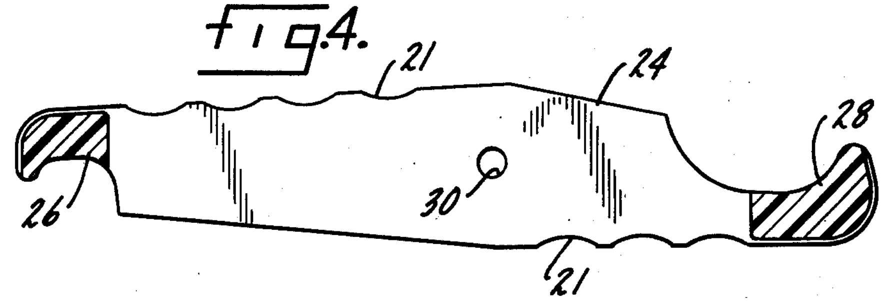
FIG. 4 is a section along line 4—4 of FIG. 3.

The arm member 12, as shown in detail in FIGS. 3 and 4, includes a plurality of arms or leaves 24, shown in this case as four, interconnected at each end by spacers 26 and 28 with a hole 30 aligned through all the leaves or arms for the pivot. The outer arm member 12 is formed by plastic molding and is an integral, unitary piece interconnected at each end with generally flexible extents or spans of arms between the ends thereof.

Figure 5:
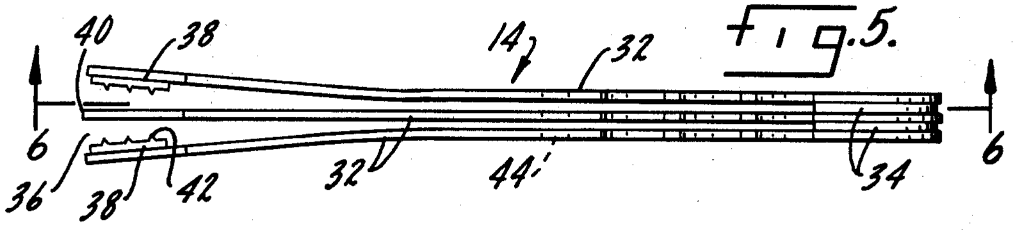
FIG. 5 is a top view of the other arm member of the fuse puller of FIGS. 1 and 2.
Figure 6:
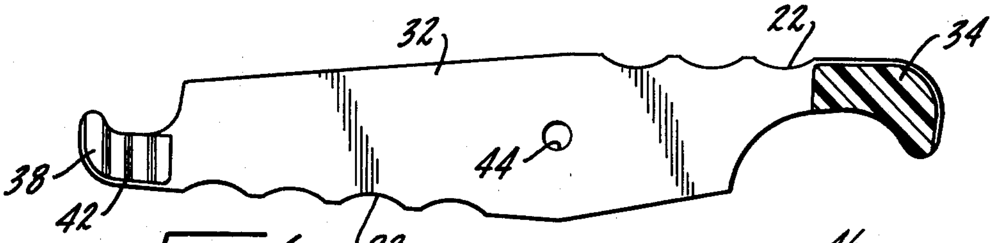
FIG. 6 is a section along line 6—6 of FIG. 5.

The inner arm member 14 is shown in FIGS. 5 and 6 as including a plurality of leaves or arms 32, shown in this case as three, which are interconnected at one end only by spacers 34 with the other end 36 being open, as shown in FIG. 5, with the leaves or arms diverging somewhat with each of the outer leaves having a spacer 38 on the inside thereof opposite the center leaf 40 which may be considered to be generally straight. The inner arm member 14 is molded generally in the condition shown in FIGS. 5 and 6 so that it is integrally joined at one end and open at the other. The inner surfaces of the spacers 38 at the open end may have energy-directing ribs 42, if desired. The leaves or arms have aligned holes 44 for the pivot.

The use, operation and function of the invention are as follows:

The fuse puller is made of two arm members, a so-called inner arm member and a so-called outer arm member, which are so named because the outer arm member has one more arm or leaf than the inner arm member which means, when they are assembled, that the arms of the inner arm member will be on the inside of the two outside arms on the outer arm member. The outer arm member is molded as an integral unit connected at each end by spacers. The inner arm member is only connected at one end, with the other end open, as shown in FIG. 5. At this point the middle or center of the arms of the outer arm member 12 may be spread slightly so that the open end of the inner arm member may be interleaved therethrough. Then the open end 36 of the inner arm member may be closed and sealed together in any suitable manner, such as by an adhesive, a heat-seal, or what-have-you, and the openings through the arm members may be lined up to form the pivot 16, either by a rivet or otherwise. Closing the open end of the inner arm and forming the pivot may be done in either order.

It has been stated that the outer arm member has one more arm than the inner arm member, but this is not essential. The number of arms could be the same and the two could function with each arm member slightly off-center to the other side. Also, each arm member could have its ends slightly bent in such that they line up correctly when assembled.

Also, the inner arm assembly has been stated as having one end open to facilitate assembly. But it might be the other way around. For example, the outer arm assembly might have one end open with both ends of the inner arm assembly closed. Also, both arm assemblies or members could have one end open which would greatly facilitate the interleaving operation, but this would require an extra rivet or securing, since two open ends would need to be closed.

Figure 7:
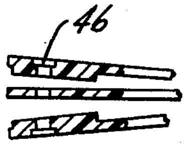
FIG. 7 is a detail of an alternant form.

The manner of securing the open end, be it one or two, by an adhesive or otherwise, is optional. It might be done by welding or a rivet might be inserted. For example, in FIG. 7 an alternate form of open end has been shown in which rivet holes are shown, as at 46, and this might be a desirable arrangement when the parts are made out of a material which does not lend itself readily to adhesive fastening. But if it is desired to glue or weld the parts together, such as shown in FIGS. 5 and 6, the material might be any one from the family of plastics which respond to either of these techniques. The fuse puller could be made with as few as two leaves on each member, or there might be a greater number, for example something on the order of seven leaves, with possibly six or seven on the so-called inner member.

While the preferred form and several variations have been shown and suggested, it should be understood that suitable additional modifications, changes, substitutions and alterations may be made without departing from the invention's fundamental theme.

The embodiments of the invention in which an exclusive property or privilege is claimed are defined as follows:

1. A method of making a gripper-type fuse puller which has two crossed scissor-type arm members interconnected and turnable about a pivot with fuse-gripping jaws on the inside of such arm members at least at one end thereof, each arm member having a plurality of generally parallel arms with at least one spacer at each end interconnecting the arms of each member, including the steps of forming the spacers and arms of both members integrally at least at one end thereof so at least one of the arm members will have the arms at the other end free to be flexed apart at an open end, passing the open end of the said one arm member between the arms of the other arm member, and thereafter adhering the arms and spacers together at each of the open ends and forming a pivot in the middle of the arm members.

2. The method of claim 1 further characterized in that only one of the arm members is formed with an open end and the spacers at both ends of the arm members are integral with the arms so that the open end of the said one arm member is passed through and integrated between the center area of the arms of the said other arm member.

3. The method of claim 1 further characterized in that the step of forming the arm members includes forming the other arm member with one more arm than the one arm member so that, when assembled, the other arm member will have arms on the outside of the arms of the one arm member.

4. The method of claim 1 further characterized in that the step of adhering the arms and spacers together at the open end of the one arm member involves the use of an adhesive.

5. The method of claim 1 further characterized in that the step of forming the arm members includes plastic molding.

6. The method of claim 1 further characterized by and including the step of spreading the center of the arms of the other arm member so that the open end of the one arm member may be inserted therethrough.

7. The method of claim 1 further characterized in that one of the arm members is an outer arm member and has one more arm than the inner arm member.

8. The method of claim 1 further characterized in that the arm members are formed with jaws on the inside of each end thereof.

9. The method of claim 1 further characterized in that the arm members are formed with finger-gripper portions on the outside of each end thereof.

10. The method of claim 1 further characterized in that the step of forming the arms and spacers on the one arm member includes flaring the arms and spacers somewhat at the open end.

11. The method of claim 1 further characterized in that only one of the arm members is formed with an open end and the spacers at both ends of the other arm member are integral with the arms thereof, and further including the step of spreading the center of the other arm member and passing the open end of the said one arm member therethrough.

* * * * *